(12) United States Patent
Bonaventura

(10) Patent No.: US 6,791,767 B2
(45) Date of Patent: Sep. 14, 2004

(54) MAGNETIC OPTICAL ELEMENT HOLDER AND MICROSCOPE ASSEMBLY INCLUDING SAME

(75) Inventor: Russell Bonaventura, Colden, NY (US)

(73) Assignee: Leica Microsystems, Inc., Depew, NY (US)

( * ) Notice: Subject to any disclaimer, the term of this patent is extended or adjusted under 35 U.S.C. 154(b) by 34 days.

(21) Appl. No.: 10/244,354

(22) Filed: Sep. 16, 2002

(65) Prior Publication Data

US 2004/0051979 A1 Mar. 18, 2004

(51) Int. Cl.$^7$ .................................. G02B 7/02
(52) U.S. Cl. ................. 359/819; 359/385; 359/391; 359/827
(58) Field of Search ............................... 359/811, 812, 359/815, 819, 827, 368, 387, 391, 386

(56) References Cited

U.S. PATENT DOCUMENTS

| | | | |
|---|---|---|---|
| 4,468,321 A | 8/1984 | St. John | 210/232 |
| 4,597,643 A | 7/1986 | Podvin et al. | 359/368 |
| 5,619,293 A * | 4/1997 | Usui | 396/55 |
| 5,933,287 A * | 8/1999 | Muller | 359/819 |
| 6,322,223 B1 | 11/2001 | Smith et al. | 359/871 |

FOREIGN PATENT DOCUMENTS

DE 19702754 A1 1/1997

* cited by examiner

Primary Examiner—Huy Mai
(74) Attorney, Agent, or Firm—Simpson & Simpson, PLLC

(57) ABSTRACT

A microscope having a base mounted illuminator, an optical element holder operatively arranged to hold an optical element within a beam path of the microscope, and, means for magnetically securing the optical element holder to the illuminator. The optical element holder of the invention includes a housing having a top surface and a bottom surface, the housing having an aperture operatively arranged to hold an optical element, such as a filter or the like, and, at least one magnet attached to, and extending from the bottom surface of the housing, the magnet operatively arranged to be attracted to a portion of the base-mounted illuminator. A magnetic optical element holder and optical element for a microscope in combination, having an annularly shaped housing having a flanged aperture therein, the housing having a top surface and a bottom surface, the optical element operatively arranged to be held within the flanged aperture, and, at least one magnet attached to the bottom surface of the housing. A magnetic optical element holder and illuminator for a microscope, the illuminator mounted in a base of the microscope, the illuminator having at least some ferromagnetic characteristic, an optical element holder comprising a housing having an aperture therein arranged to hold an optical element, the housing having a top surface and a bottom surface, and, at least one magnet mounted to the housing and arranged to hold the holder to a portion of the illuminator.

10 Claims, 5 Drawing Sheets

MAGNETIC OPTICAL ELEMENT HOLDER AND MICROSCOPE ASSEMBLY INCLUDING SAME

FIELD OF THE INVENTION

The present invention relates generally to microscopy, more specifically to microscopes, and, even more particularly, to an optical element holder for a microscope.

BACKGROUND

As is well known, a microscope is an optical instrument used to view, examine and study very small objects. There are many different types of microscopes, each best suited to particular applications. These include compound microscopes, stereomicroscopes, confocal microscopes, inverted microscopes, laser microscopes, fluorescence microscopes and polarizing microscopes, to name but a few.

The present invention relates generally to compound microscopes and to those microscopes which use the same or similar optical arrangement found in a conventional compound microscope.

A variety of removable components are frequently used with compound microscopes to provide diverse types of light to illuminate the object being investigated. Using different types of lighting enables a greater range of observations to be made using the same instrument. Components of this type include light filters that allow the selective transmission of certain types of light, such as UV light, while preventing other types of light from reaching the object.

One difficulty in using light filters and other removable components with microscopes is the necessity of attaching them in a secure manner to the microscope while still making them easy to remove and replace. Components secured with screws or similar fasteners are sometimes difficult and inconvenient to remove or exchange with another component. However, minimal or no attachment mechanism can result in accidental displacement or misalignment of the component, with possible damage to the component. This is especially true in educational settings in which the user may be an inexperienced student who may be performing a variety of exercises requiring a variety of different components in a limited period of time. Finally, because components such as filters are frequently removed from microscopes, they can be misplaced creating a problem in conducting the required investigations.

Others have disclosed filter mounts for microscopes. German Patent Application DE 197 02 754 discloses a laser microscope having a filter wheel which holds a plurality of filters for examination at different wavelengths, and the individual filters are housed in a carrier attached to the filter wheel by mechanical and/or magnetic means. This publication includes no teaching, however, of using magnetic means to secure an optical element in the beam path at the base of a microscope.

What is needed, then, is an improved apparatus for secure attachment of an optical element for a microscope.

SUMMARY OF THE INVENTION

The present invention broadly comprises a microscope assembly comprising a microscope having a base mounted illuminator, an optical element holder operatively arranged to hold an optical element within a beam path of the microscope, and, means for magnetically securing the optical element holder to the illuminator. The optical element holder of the invention includes a housing having a top surface and a bottom surface, the housing having an aperture operatively arranged to hold an optical element, such as a filter or the like, and, at least one magnet attached to, and extending from the bottom surface of the housing, the magnet operatively arranged to be attracted to a portion of the base-mounted illuminator.

The invention also comprises, in combination, a magnetic optical element holder and optical element for a microscope, having an annularly shaped housing having a flanged aperture therein, the housing having a top surface and a bottom surface, the optical element operatively arranged to be held within the flanged aperture, and, at least one magnet attached to the bottom surface of the housing.

The invention also comprises, in combination, a magnetic optical element holder and illuminator for a microscope, having an illuminator mounted in a base of the microscope, the illuminator having at least some ferromagnetic characteristic, an optical element holder comprising a housing having an aperture therein arranged to hold an optical element, the housing having a top surface and a bottom surface, and, at least one magnet mounted to the housing and arranged to hold the holder to a portion of the illuminator.

A general object of the invention is to provide an optical element holder that is detachably mounted to an illuminator in the base of a microscope stand.

Another object of the invention is to provide a magnetic mounting arrangement for an optical element holder for a microscope.

A further object of the invention is to provide a mounting arrangement for an optical element holder for a microscope which avoids unintentional movement of the optical element during use.

Still another object of the invention is to provide a convenient storage place in the base of the microscope for the magnetic optical element when it is not in use.

These and other objects, features, and advantages of the present invention will become readily apparent to those having ordinary skill in the art upon reading the following detailed description of the invention in view of the several drawings of the invention.

BRIEF DESCRIPTION OF THE SEVERAL VIEWS OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical structural elements of the invention. While the present invention is described with respect to what is presently considered to be the preferred embodiments, it is understood that the invention is not limited to the disclosed embodiments The present invention broadly comprises a microscope assembly including a microscope having a base mounted illuminator, an optical element holder operatively arranged to hold an optical element within a beam path of the microscope, and, means for magnetically securing the optical element holder to the illuminator. A conventional compound microscope is shown in perspective view in FIG. 1. Although the invention is suitable for use with a variety of microscopes and other optical instruments, it is useful to review basic microscope structure and function to appreciate the present invention.

Figure 1:
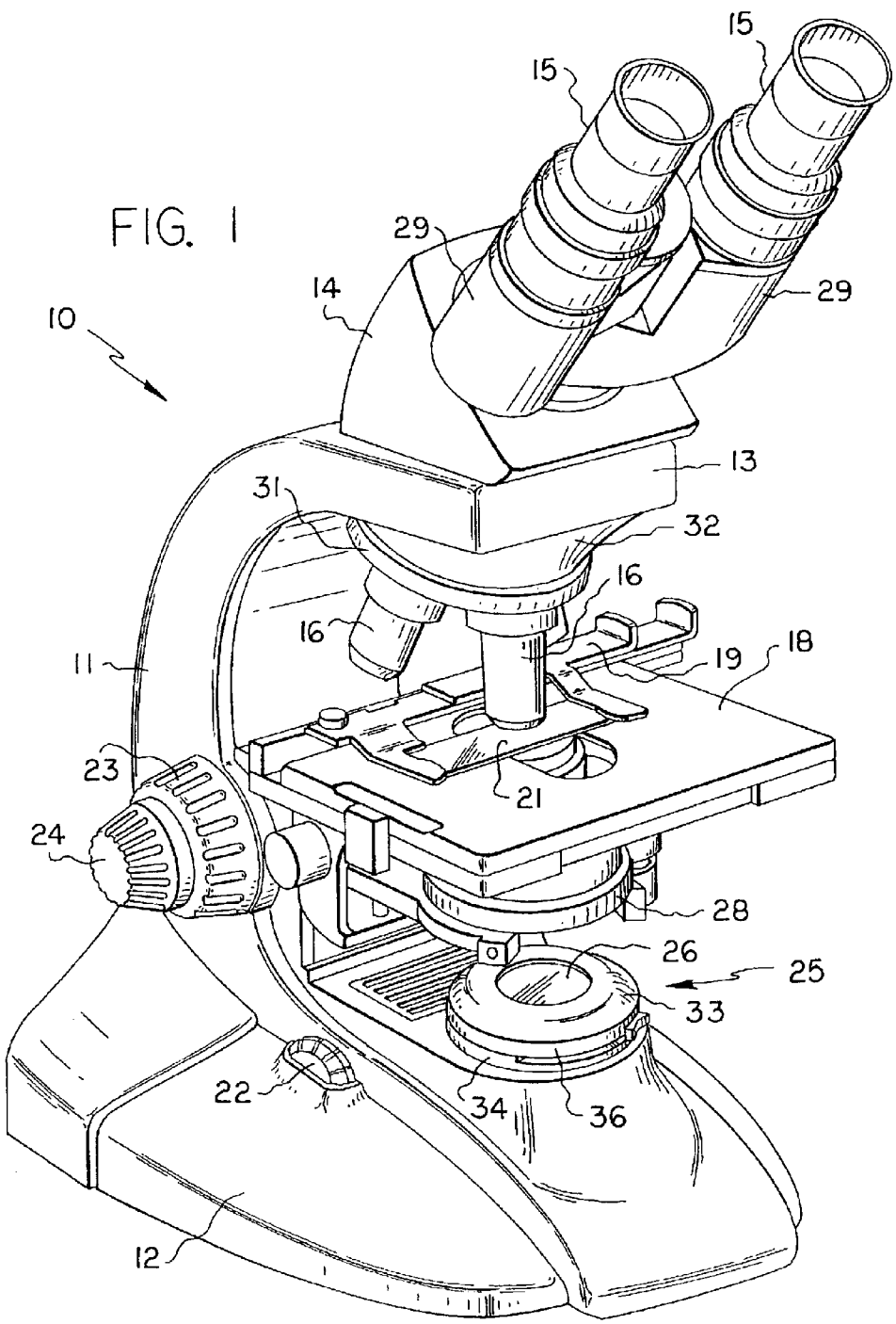
FIG. 1 is a perspective view of a typical compound microscope with which the magnetic optical element holder of the present invention is adaptable for use.

FIG. 1 illustrates compound microscope 10. The microscope includes stand 11 which includes base 12 and eyepiece/objective mounting platform 13. Viewing body 14 is mounted to a top surface of mounting platform 13. In the embodiment shown, the viewing body is binocular, comprising twin eyepieces 15 mounted in eye tubes 29. The viewing body is not germane to the invention, which is suitable for use with a microscope configured with any type of viewing body (monocular, binocular, trinocular, video, etc.). Objectives 16 are mounted to turret 31, rotatably mounted to nosepiece 32, which in turn is mounted to a bottom surface of platform 13. The microscope includes stage 18 upon which a specimen to be viewed is placed. The specimen is placed on slide 21, held by mechanical stage 19. Illuminator 25 is mounted in base 12 of microscope 10. The illuminator provides a controllable source of light to illuminate the specimen as is well known in the art. In the several drawing views of the invention, a Koehler type illuminator is shown, although the invention is suitable for use with other illuminator configurations as well. The illuminator is activated by power switch 22. Light from the illuminator travels in a beam upwardly through condenser 28, which functions to gather and focus the light. In addition to a light source, the illuminator also includes an iris diaphragm (shown in part in cross-section in FIG. 7) constructed of a number of interconnected leaves that, when adjusted by lever 35 (shown in FIGS. 2 and 3), open and close the iris to control the light. Knob 23 provides coarse focus adjustment and knob 24 provides fine focus adjustment.

As seen in FIG. 1, optical element holder 33 of the present invention mounts atop illuminator 25 at the base of the microscope.

Figure 2:
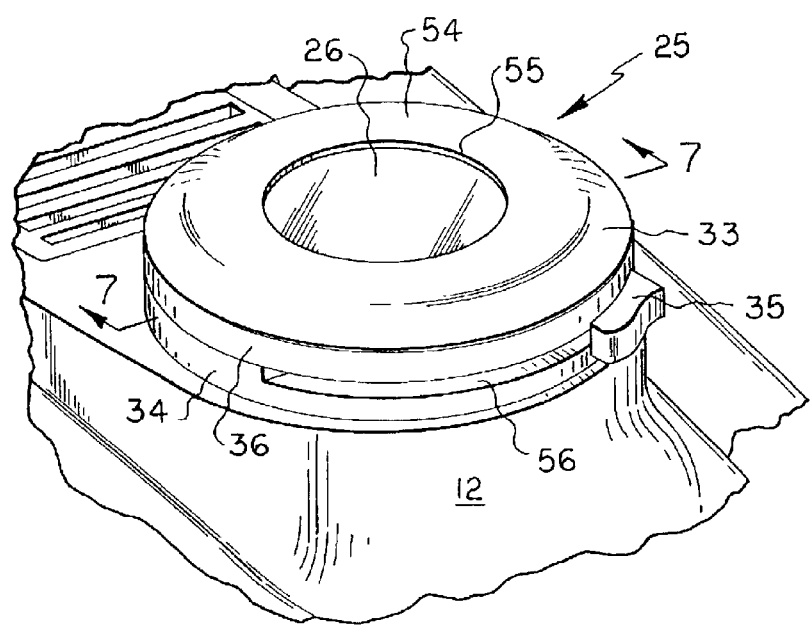
FIG. 2 is a fragmentary perspective view of the illuminator of the microscope shown in FIG. 1, with the optical element holder in place atop the illuminator.

The illuminator and optical element holder assembly is shown in enlarged fragmentary perspective in FIG. 2. Illuminator 25 includes illuminator housing (lower mount) 34 and iris housing (upper mount) 36. (The source of illumination is located within the base of the microscope but is not shown since it is not particularly germane to the present invention.) Again, the iris is controlled by lever 35 which slidably moves laterally in slot 56. In FIG. 2, holder 33 is shown holding filter 26, which may be any one of a variety of filters, including but not limited to ultraviolet (UV) filter, color filter, phase contrast filter, and the like. The holder is suitable for use in holding other optical elements, besides filters, in other optical instruments. In the embodiment shown, holder 33 is seen to comprise an annularly shaped ring having a central round aperture 37 (shown in FIG. 4). The aperture includes a flange 55, shown in FIGS. 2 and 7, which functions to hold and retain optical element 26. Preferably, optical element 26 is held in flanged aperture 37 by a UV—cured adhesive such as Nordland™ 61 brand cement, although other suitable adhesives are known to those skilled in the art. It should be appreciated that although the optical element holder is annularly shaped in a preferred embodiment, the claims to the invention are not so limited, and are intended to be directed to any shape holder, such as round, elliptical, or rectilinear.

Figure 3:
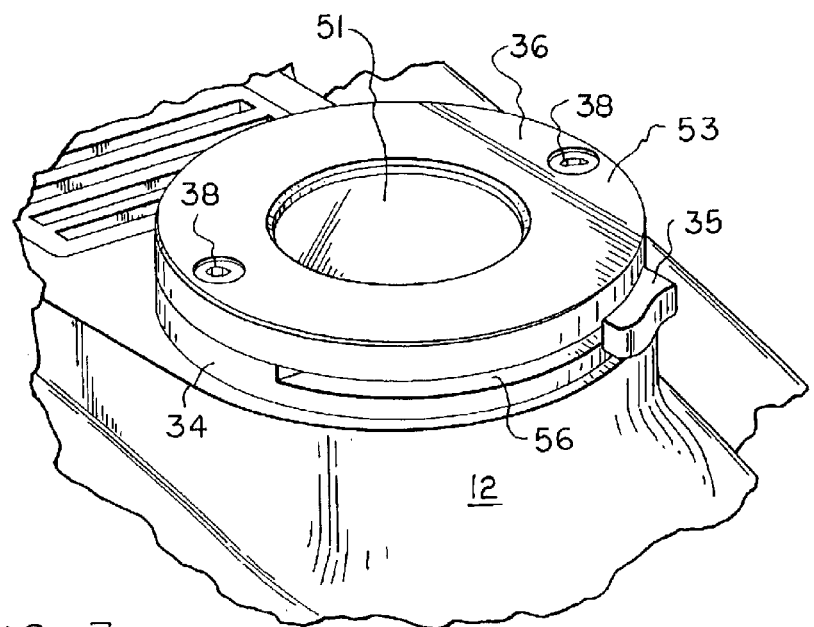
FIG. 3 is a view similar to that of FIG. 2 but with the optical element holder removed to show the base of the illuminator.

FIG. 3 is a perspective view similar to that of FIG. 2, except with holder 33 removed to show top surface 53 of iris housing (upper mount) 36 of the illuminator. This view also shows mounting screws 38 which secure the iris housing and illuminator housing (lower mount) 34 to microscope base 12. In a preferred embodiment, the screws are recessed below surface 53, and the screws are made of a ferromagnetic material. It should be appreciated, however, that it is not necessary that the screws be recessed, although this is preferred.

Figure 4:
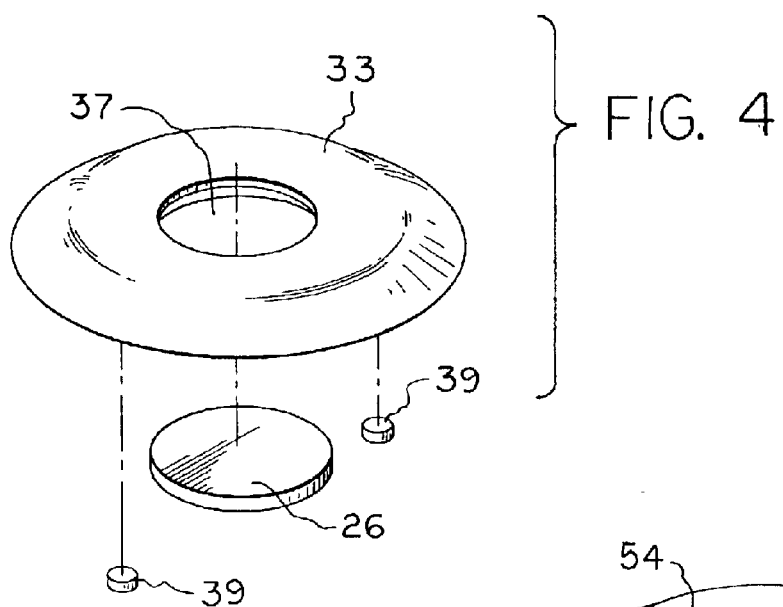
FIG. 4 is a perspective exploded view of the optical element holder of the present invention.
Figure 5:
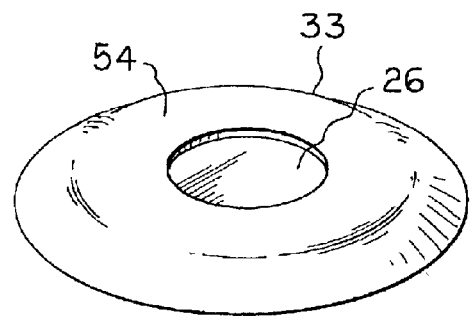
FIG. 5 is a top perspective view of the optical element holder of the invention, shown with the optical element (filter) in place within the holder.
Figure 6:
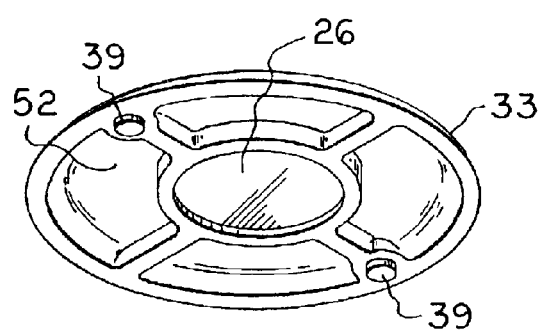
FIG. 6 is a bottom perspective view of the optical element holder shown in FIG. 5.

Holder 33 is shown in perspective exploded view in FIG. 4. As seen in this drawing view, optical element 26 is mounted within flanged aperture 37 from below. This view also shows magnets 39 which mount in recesses 41 in holder 33 (shown in FIGS. 6 and 8). The assembled holder is shown in perspective view in FIG. 5. The holder is shown in bottom perspective view in FIG. 6. This view more clearly shows magnets 39, and also shows bottom mounting surfaces 52 of holder 33. FIG. 6 also shows the underside of optical element 26. In a preferred embodiment, two magnets are used, but it should be apparent to those skilled in the art that any number of appropriate magnets may be used. A suitable magnet is a neodymium magnet, available commercially by Rochester Magnet Company, Rochester, N.Y. The magnets can be attached using epoxy or other adhesives known to those skilled in the art.

Figure 7:
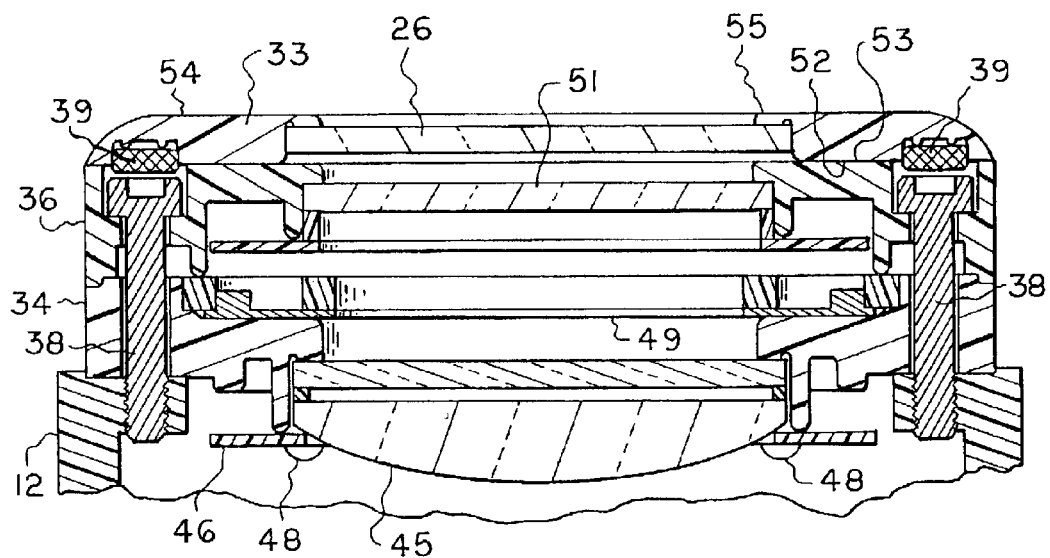
FIG. 7 is a fragmentary cross-sectional view of the magnetic optical element holder of the invention, shown mounted atop the illuminator of the microscope, with the optical element in place within the holder, which view is taken generally along line 7—7 in FIG. 2.
Figure 8:
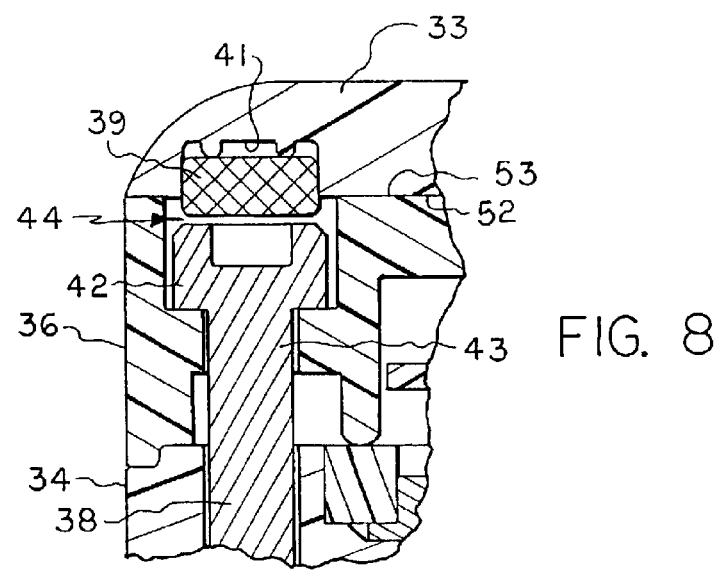
FIG. 8 is an enlarged view of the upper left section of the assembly shown in FIG. 7, enlarged to show the detail of the magnet/screw head interface; and, FIG. 9 is a bottom view of the microscope shown in FIG. 1, illustrating the optical element holder magnetically affixed to the bottom of the microscope base.

FIG. 7 is a fragmentary cross-sectional view of the magnetic optical element holder of the invention, shown mounted atop the illuminator of the microscope, with the optical element in place within the holder, which view is taken generally along line 7—7 in FIG. 2. This view shows bottom surface 52 of holder 33 in flush contact with top surface 53 of iris housing 36. This view also shows how magnets 39 are aligned with, and attracted to, screw 38 and, more specifically, to head 42 (shown in FIG. 8) of screw 38. As seen in FIG. 8, screw 38 comprises head 42 and threaded body portion 43, which functions to hold iris housing 36 to illuminator housing 34 and to base 12 of the microscope. In a preferred embodiment, the screws are recessed below top surface 53 of iris housing 36, and are made of a ferromagnetic material. This cross sectional view also shows other elements of the microscope illuminator, not particularly germane to the present invention, including lens 45, retainer 46, retaining screws 48, iris leaves 49 and illuminator cover glass 51.

FIG. 8 is an enlarged view of the upper left-hand portion of the assembly shown in FIG. 7. This view clearly shows that in a preferred embodiment, the magnet, secured within recess 41 of holder 33, is not in contact with screw 38 when the holder is in place. Rather, there is an air gap 44 between magnet 39 and head 42 of screw 38. This structure is preferred as the holder/iris housing interface is one of machined surfaces, important in aligning the filter in the light beam. If the magnets were permitted to contact the screw heads, then magnet mounting tolerances and screw torques would need to be much more precise to assure proper alignment of the holder with the iris housing.

Although magnet 39 can be flush mounted relative to bottom surface 52 of holder 33, magnet 39 is preferably mounted in recess 41 of holder 33 as shown in FIGS. 7 and 8. As seen in FIG. 8, recess 41 preferably has a depth such that magnet 39 protrudes beyond bottom surface 52 of holder 33. In a preferred embodiment, the magnet protrudes about 0.55 mm from surface 52. The protrusion aids in the secure attachment of the optical element when mounted on a microscope, and tends to keep the holder from rotating. In a preferred embodiment, magnet 39 is secured in the recess with at least one drop of plastic-metal adhesive, such as Devcon Gel.

Figure 9:
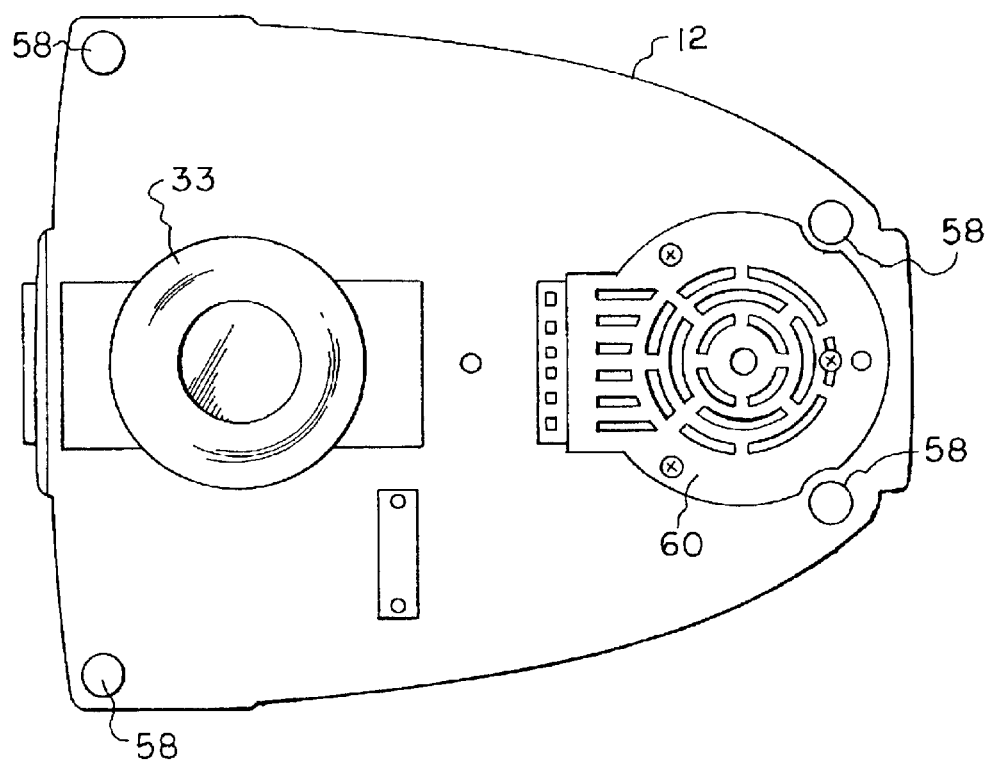

FIG. 9 is a bottom view of the microscope shown in FIG. 1. Base 12 of the microscope is seen to include feet 58, which elevate the base over a surface, and door 60, which is removable for access to the light source. In a preferred embodiment the base of the microscope, or a portion thereof, is ferromagnetic, which provides a convenient storage location for the optical element holder of the invention. As seen in FIG. 9, optical element holder 33 is securely and conveniently attached to the bottom of the microscope base in a safe location.

In the embodiment described, magnets fixed to the base of the optical element holder are attracted to ferromagnetic screws in the illuminator. (Ferromagnetic is defined to mean any material attracted to a magnet.) It should be appreciated, however, that the magnets could be replaced by ferromagnetic material, and the screws could be magnets. Or, alternatively, the entire base or a portion thereof could be made of ferromagnetic material, as could portions of the illuminator.

Thus it is seen that the objects of the invention are efficiently obtained, although changes and modifications to the invention should be readily apparent to those having ordinary skill in the art, which changes are considered to be within the scope of the invention as claimed. For example, although the invention is shown in combination with a compound microscope, it should be appreciated that the invention is suitable for use with a variety of microscope types and with other optical instruments and devices. Also, in one embodiment of the invention shown, two diametrically positioned magnets are used to secure the holder to the base of a microscope. Obviously more than two magnets could be used, distributed in a wide variety of patterns and positions. It is also possible to perform the same function with a single magnet. For example, an annularly shaped magnet could be secured to the underside of the holder, with a corresponding annular groove in the base for mounting. Any number of magnetic means of attachment may be employed, so long as the filter is properly positioned and aligned with the beam path.

What I claim is:

1. A magnetic optical element holder for a base-mounted illuminator in a microscope, comprising:

a housing having a top surface and a bottom surface, said housing having an aperture operatively arranged to hold said optical element; and, at least one magnet attached to, and extending from said bottom surface of said housing, said magnet operatively arranged to be attracted to a portion of said base-mounted illuminator.

2. The magnetic optical element holder according to claim 1 wherein said at least one magnet protrudes outwardly from a recess in said bottom surface of said housing.

3. The magnetic optical element holder according to claim 2 wherein said at least one magnet protrudes a maximum of about 0.50 millimeters from said bottom surface of said housing.

4. The magnetic optical element holder according to claim 1 wherein said at least one magnet is recessed into said bottom surface of said housing.

5. In combination, a magnetic optical element holder and illuminator for a microscope, comprising:

an illuminator mounted in a base of said microscope, said illuminator having at least some ferromagnetic characteristic;

an optical element holder comprising a housing having an aperture therein arranged to hold an optical element, said housing having a top surface and a bottom surface; and, at least one magnet mounted to said housing and arranged to hold said holder to a portion of said illuminator.

6. The combination magnetic optical element holder and illuminator for a microscope recited in claim 5, wherein said optical element holder housing is annularly shaped and said aperture is flanged to accommodate mounting of said optical element.

7. The combination magnetic optical element holder and illuminator for a microscope recited in claim 5, wherein said microscope base is ferromagnetic.

8. A microscope assembly, comprising:

a microscope having a ferromagnetic illuminator mounted in a base of said microscope; and, a magnetic optical element holder operatively arranged to be secured to said illumination mount.

9. The microscope assembly recited in claim 8 wherein said base is ferromagnetic.

10. A microscope assembly comprising:

a microscope having a base mounted illuminator;

an optical element holder operatively arranged to hold an optical element within a beam path of said microscope; and, means for magnetically securing said optical element holder to said illuminator.

* * * * *